Figure 1:
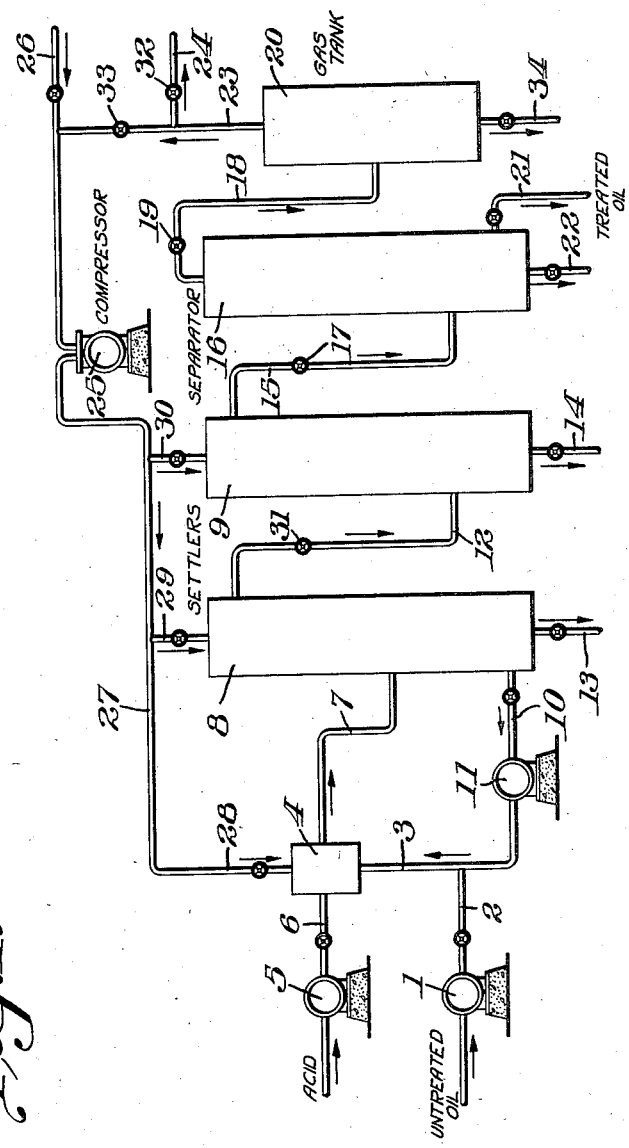

June 9, 1936.  LE ROY G. STORY  2,043,936
ART OF REFINING HYDROCARBON OILS
Filed Oct. 15, 1932  2 Sheets-Sheet 1

LEROY G. STORY
INVENTOR
BY R.J. Dearborn
HIS ATTORNEY

Patented June 9, 1936

2,043,936

UNITED STATES PATENT OFFICE 2,043,936

ART OF REFINING HYDROCARBON OILS

Le Roy G. Story, Beacon, N. Y., assignor to The Texas Company, New York, N. Y., a corporation of Delaware Application October 15, 1932, Serial No. 637,868

8 Claims. (Cl. 196—40)

This invention relates to the art of refining hydrocarbon oils and more specifically comprises an improved process for treating hydrocarbon oils with sulfuric acid.

It is customary in the refining of cracked naphthas, kerosenes, lubricating oils, etc. to subject the oils to be treated to the action of sulfuric acid to remove unstable and color compounds. As far as I am aware, however, the treatment has been carried out heretofore at substantially atmospheric pressure or therebelow.

The present invention has to do with a method for sulfuric acid treatment of oils under relatively high superatmospheric pressure and has for its objects the production of an improved refined oil, the formation of a more desirable acid sludge, and the suppression of decomposition and other reactions which tend to reduce the efficiency and effectiveness of the operations.

The invention will be more fully understood from the following description and drawings. In the drawings, Figure 1 represents diagrammatically an elevation of an apparatus for carrying out the process of the invention in batch or continuous operations.

Figure 2:
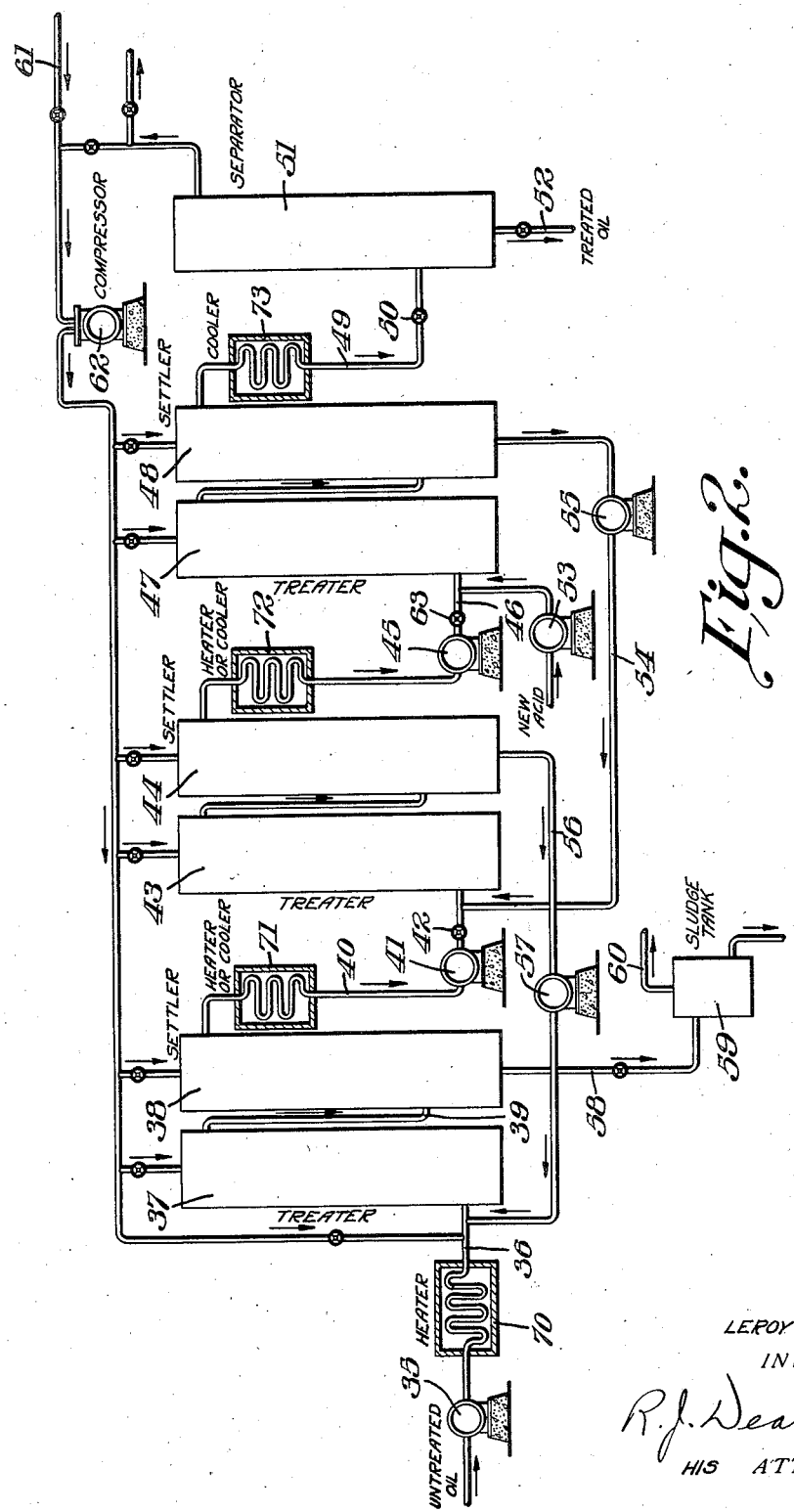

Figure 2 shows an elevation of an apparatus constructed according to the invention and adapted to operate continuously and on the countercurrent principle.

Referring now to Figure 1, the oil to be treated is forced by a pump 1 through a line 2 into the system. The untreated oil passes through a line 3 into a mixing chamber 4 where it is intimately contacted with acid pumped by a pump 5 through line 6 into the mixer 4. The oil and acid mixture then passes through line 7 into the first of the settlers 8 and 9. Further reaction usually occurs in the settler 8 and in order to obtain adequate agitation the mixture may be withdrawn from the lower portion of the settler through the line 10 by a pump 11 and recirculated. The oil overflows from the settler 8 through a line 12, controlled by a valve 31, to the settler 9. Sludge settling out in the settlers may be withdrawn through drawoff lines 13 and 14 connected to the bottoms of the settlers 8 and 9 respectively. The relatively clean oil from settler 9 next passes through a line 15 to separator 16. Pressure may be released by a valve 17 in the line 15 whereby gases and light materials separate and pass through a pipe 18, controlled by valve 19, to the gas tank 20. Treated oil may be withdrawn from the separator 16 through pipe 21 and any sludge settling out of the oil in separator 16 may be withdrawn from the bottom thereof through line 22. A certain amount of light oils may accumulate in tank 20 and may be drawn off through line 34. The gas and vapors in tank 20 may be withdrawn through line 23 and disposed of through pipe 24; or, by proper regulation of valves 32 and 33, passed through the compressor 25 whereby, alone or in mixture with other gases drawn through the line 26, they may be returned to the system through line 27 and branch connections 28, 29, and 30.

In the operation of the process with an apparatus such as shown in Figure 1, the oil may be charged continuously by the pump 1 and mixed with a suitable amount of acid in the mixer 4 and then passed on through the settlers and separator. If the desired amount of reaction is not obtained, or in case additional agitation is required, a certain amount of recirculation may be effected by the pump 11. According to one method of operation, the valve 31 may be closed and the system operated as a batch operation. Thus the oil and acid in proper proportions are charged in batch to the chamber 8 which in this case serves as an agitator, and the material circulated until the proper degree of reaction between the oil and the acid is obtained, and then the sludge is allowed to settle and is drawn off.

The pressure may be applied in several ways, either separately or in combination. The pump may be operated to provide a high mechanical pressure and this, together with the gases evolved, such as sulfur dioxide, may provide adequate pressure when confined. I prefer, however, especially in continuous operations, to supply gas pressure by means of the compressor 25, and in this way gases, such as sulfur dioxide or hydrocarbons, may be recirculated; or, an extraneous supply of the same gases or other inert gases, such as air, carbon dioxide, etc., may be used. It is sometimes advantageous, particularly in regard to the color of the oil, to supply an external pressure of sulfur dioxide to various points of the system as indicated. It is to be understood that in the chamber 8 I may resort to other means of agitation besides circulation by the pump 11 and the mixing chamber 4. In some instances, say for example, in batch operations, it is contemplated that mechanical agitation, such as a stirrer, or a stream of gas sufficient to continuously turn over the oil by bubbling through the mixture during treatment, may be employed.

Referring now to Figure 2, I have shown an apparatus adapted for continuous operation on the counterflow principle, which is often desirable for light oil and even for heavy oils wherein, according to the present invention, a more fluid sludge may be obtained than normally results from the prior art treating operations. The untreated oil is forced by pump 35 through pipe 36 to the first treater 37 and settler 38, the latter being connected by a line 39. The partially treated oil from settler 38 then passes through line 40, pump 41, controlled by valve 42, to another treater and settler 43 and 44 respectively. In a similar manner the oil from settler 44 is pumped by pump 45 through pipe 46, controlled by valve 63, to another treater and settler 47 and 48 respectively. From the final settler 48 the oil passes through the line 49, controlled by valve 50, to separator 51, from which the treated oil is drawn off through the pipe 52. Thus far I have described the flow of the oil.

The acid flows essentially in the reverse direction to that of the oil. The new acid is charged by pump 53 into line 46 where it comes in contact with the partially treated oil in the last treater 47. The partially spent acid is withdrawn from the bottom of the final settler 48 through line 54 and is forced by a pump 55 into line 40 where it mixes with the acid-oil from the first settler 38, and the mixture is transferred to the intermediate treater 43. Spent acid from the intermediate settler 44 is withdrawn through line 56 and is forced by a pump 57 into line 36 where it mixes with the untreated oil in the first treater 37. The spent acid is withdrawn from the first settler 38 through line 58 to sludge tank 59 from which gases may be liberated and released through pipe 60 or returned by connections, not shown, to the system through line 61 and compressor 62, referred to hereinafter.

In the charging line 36, there is provided a heater or cooler 70 by means of which I may raise the oil to be treated to any desired temperature prior to mixing the acid therewith. Likewise in the lines 40 and 46, connecting settler 38 with treater 43 and settler 44 with treater 47, I have provided heaters or coolers 71 and 72 respectively whereby suitable control of temperatures in the treaters 43 and 47 may be obtained. Also, in line 49, at the outlet of the final settler 48 there is positioned a cooler 73 to cool the treated oil prior to release of the pressure thereon in the separator 51. By means of the heaters and coolers I may obtain any desired temperature differential in the various parts of the system.

In the operation of the process with an apparatus such as shown in Figure 2 the untreated oil is pumped through the heater 70 and after proper temperature adjustment it is transferred into treater 37 where intimate mixture with spent acid in the line 56 occurs. The treaters may contain mechanical agitators or orifice plates to obtain the mixing, but usually sufficient agitation is obtained as the oil passes through elongated vertical towers. The spent acid settles out in settler 38 and is drawn off to tank 59 while the partially treated oil, after further temperature adjustment, is mixed with partially spent acid from line 54 and the mixture is passed to treater 43. The partially spent acid settling out from the bottom of settler 44 is returned through line 56 to the first treater, as mentioned heretofore. The partially spent oil from settler 44 is further adjusted in temperature and then mixed with fresh acid and the mixture transferred to the final treater 47 and settler 48. The acid drawn off from the bottom of the settler 48 is returned to treater 43.

In general it is usually preferable to maintain the highest temperature in the initial stages of the operation and the lowest temperature on the oil which comes in contact with the fresh acid in the latter stages of the operation to prevent undue reaction. In some cases, particularly at low temperatures and with light oils, such as cracked naphthas and kerosenes wherein the acid sometimes exerts considerable solvent effect, it is contemplated that the higher temperatures may be maintained in the intermediate stages of the operation, for example, in treating cracked naphtha I may use the heater 70 as a chiller and thereby maintain a temperature of $-20°$ F. to $+40°$ F. in the first stage and 25° F. to 100° F. in the intermediate stage and from 50° F. to 80° F. in the final stage. For kerosenes and certain light lubricating oils I may use the higher temperatures in the first stage, that is, the treater 37 and settler 38; say around 100° F. to 200° F., and 90° F. to 150° F. in the intermediate stage, and 50° F. to 100° F. in the final stage.

As to the pressure for operations according to the invention I may say in general that it is usually advantageous to maintain the higher pressures when the higher temperatures are used. When operating by a counterflow process, as in the apparatus of the type shown in Figure 2, a pressure differential may be maintained between the various stages, if desired, by proper manipulation of the control valves and the pumps in the various lines. It is often desirable, particularly in low temperature operations, to apply a substantial pressure of gas by means of a compressor. Permanent hydro-carbon gases or sulfur dioxide may be used. In some instances, say for light oils, an improved color is produced by using sulfur dioxide.

It is contemplated, according to the invention, that pressures of the order of about 3000 lb. per sq. in. may be used and generally improved results appear from about 300–1000 lb. and up. When treating cracked naphtha and certain kerosenes 500–1500 lb. may give good results with temperatures up to 100° F. For the treatment of refractory kerosenes and in lubricating oils particularly, at temperatures up to 200° F., somewhat higher pressures may be applied, for example, 1000–2000 lbs., or above. In batch or continuous operations wherein the treatment is in a single stage one pressure may be used for the entire treating operation, while in a counterflow process a pressure differential may be maintained between the various stages to correspond with the temperature and to give optimum treating conditions.

For purposes of illustrating the operation of the invention the following examples may be given:

A cracked naphtha is cooled to 0° F. and charged to a continuous system having three stages of treatment. A pressure of about 500 lb. per sq. in. is maintained on the first stage. The oil from the first stage is heated to about $+40°$ F. and charged to the second stage where the pressure is raised to about 1000 lb. The oil is cooled to about 20° F. in the third stage wherein a pressure of 750 lb. per sq. in. is maintained. New acid, 66° Baumé, for example, is mixed with the oil in the final stage and spent acid passed countercurrent to the oil through the other stages, as described heretofore. An oil of improved quality as to gum, color, and anti-knock property is obtained. In order to maintain the pressure desired, a mixture of about equal parts of sulfur dioxide and hydrocarbon gases is mixed with the oil in the various stages.

A heavy lubricating oil with a viscosity of about 250 seconds Saybolt at 210° F. is treated in a batch agitator with about 30 lb. of 98% sulfuric acid at a temperature of about 180° F. and an initial pressure of around 600 lb. per sq. in. The gases evolved are confined and a self-generated pressure of about 1500 lb. is allowed to develop. A treated oil with improved color and with sludge of greater fluidity is obtained.

An advantage of my process is the suppression of decomposition and side reactions which are injurious to the finished oil, particularly as to emulsion and color tests. The sludge resulting from operations according to the invention is usually fluid and often contains less occluded oil than that produced by operations carried out under atmospheric pressure.

While I have indicated in the examples that higher temperatures and pressures may be used on the heavier grades of oils, I do not wish to limit myself to such conditions. Neither is the invention restricted to the strength of acids in the examples or to the types of oil on which certain strengths of acids may be used. It will be observed that with different oils and different strengths of acids the temperatures and pressures will vary and a reasonable choice by one skilled in the art will readily be made and improved results obtained with the pressure ranges specified.

Obviously many modifications and variations of the invention, as hereinbefore set forth, may be made without departing from the spirit and scope thereof, and therefore only such limitations should be imposed as are indicated in the appended claims.

I claim:

1. In a process of purifying hydrocarbon oils by acid treatment with sulfuric acid, the improvement which comprises intimately contacting the oils and acid at temperatures normally used in acid treating operations to effect removal of undesirable impurities by reaction and extraction by the acid while maintaining the reacting materials under a superatmospheric pressure of the order of about 300–3000 lb. per sq. in.

2. A continuous process for the purification of hydrocarbon oils comprising subjecting a flowing stream of the oil to be treated to a plurality of treating operations, subjecting the oil in said treating operations at temperatures not greatly in excess of 200° F. to the action of sulfuric acid travelling essentially in countercurrent relation to the oil and maintaining a superatmospheric pressure of about 300–3000 lb. per sq. in. on the oil in said treating operations.

3. The method according to claim 2 in which a differential pressure is maintained on the oil in the various treating operations.

4. The method of purifying hydrocarbon oils which comprises countercurrently treating the oil at maximum temperatures not greatly in excess of 200° F. with sulfuric acid in a plurality of stages wherein the oil is initially contacted with spent acid and finally with new acid, maintaining a higher temperature on the oil contacted with the spent acid than the oil contacted with new acid and maintaining a superatmospheric pressure of the order of at least about 500 lb. on the oil during the treating operations.

5. The method of purifying hydrocarbon oils which comprises subjecting the oil to be treated at temperatures not greatly in excess of 200° F. to a plurality of sulfuric acid treating operations maintained under differential temperature and pressure conditions, applying a higher pressure on that operation wherein the oil is at the higher temperature and maintaining a pressure of the order of at least about 500 lb. per sq. in. on the oil in at least one of said treating operations.

6. The method of refining hydrocarbon oils which comprises contacting the oil with sulfuric acid at temperatures of about −20° F. to 200° F. and under a superatmospheric pressure of at least about 300 lbs. per sq. in. and separating the spent acid together with the reaction and extraction products from the refined oil.

7. The method of refining petroleum naphtha which comprises contacting the naphtha with sulfuric acid at temperatures of about −20° F. to 100° F. while under a superatmospheric pressure of about 500–1000 lbs. per sq. in., maintaining a substantial partial pressure of sulfur dioxide in the system by introducing sulfur dioxide into the naphtha under treatment and separating the acid and accompanying impurities from the refined oil.

8. The method of refining mineral lubricating oils which comprises contacting the oil with sulfuric acid at temperatures of about 50°–200° F. while under a superatmospheric pressure of about 500–1500 lbs. per sq. in., confining the gases evolved including sulfur dioxide to substantially self-generate the pressure and separating the acid and accompanying impurities from the refined oil.

LE ROY G. STORY.